United States Patent [19]

Colon

[11] Patent Number: 4,579,095

[45] Date of Patent: Apr. 1, 1986

[54] APPARATUS FOR HEATING AN ENGINE USING A DUAL-POSITION CONTINUOUS FLOW VALVE ASSEMBLY

[76] Inventor: Ernesto J. Colon, 3054 N. Kedzie Ave., Chicago, Ill. 60618

[21] Appl. No.: 690,506

[22] Filed: Jan. 10, 1985

[51] Int. Cl.[4] ....................... F02N 17/02; F16L 37/28

[52] U.S. Cl. ........................ 123/142.5 R; 137/614.04; 137/614.05; 251/149.8; 251/149.9

[58] Field of Search ................................ 123/142.5 R; 137/614.02, 614.03, 614.04, 614.05, 798; 251/149.8, 149.9

[56] References Cited

U.S. PATENT DOCUMENTS

| | | | |
|---|---|---|---|
| 488,717 | 12/1892 | Pettet | 137/614.04 |
| 2,159,906 | 5/1939 | Montgomery et al. | 137/614.04 |
| 2,359,648 | 10/1944 | Jones . | |
| 2,471,798 | 5/1949 | Thomas . | |
| 2,716,400 | 8/1955 | Smith et al. . | |
| 3,074,430 | 1/1963 | La Belle . | |
| 3,211,178 | 10/1965 | Kiszko | 137/614.04 |
| 3,289,700 | 12/1966 | Gildone . | |
| 3,373,728 | 3/1968 | Collins . | |
| 3,653,405 | 4/1972 | Nelson . | |
| 4,051,825 | 10/1977 | Elder . | |
| 4,269,219 | 5/1981 | Dybuig | 137/614.03 |
| 4,285,364 | 8/1981 | Hawker | 137/614.03 |
| 4,305,354 | 12/1981 | Majkrazak . | |
| 4,476,897 | 10/1984 | Morrill | 137/614.03 |

*Primary Examiner*—Ira S. Lazarus
*Attorney, Agent, or Firm*—Laubscher & Laubscher

[57] ABSTRACT

A dual-position continuous flow valve assembly is disclosed, characterized by similarly configured male and female valve members each containing a piston spring biased to a first position. When the valve members are disconnected, the pistons are in their first positions and a single flow path between inlet and outlet openings of the valve members is defined. When the valves are connected by a quick connect/disconnect device, the pistons are axially displaced to their second positions to define two separate flow paths. One flow path is from the male valve inlet opening to the female valve outlet opening via first corresponding passages defined in the valve chambers by the stem portions of the pistons. A second flow path is from the female valve inlet opening to the male valve outlet opening via second corresponding passages defined in the valve chambers by the piston stem portions. The valve assembly is used to couple the cooling system of a cold engine with a heated fluid source, whereby the heated fluid from the source may be circulated through the engine to facilitate starting thereof, or to supply emergency heat with a number of emergency heating attachments such as a water blanket or an auxiliary hot fluid heater with an electric blower.

11 Claims, 10 Drawing Figures

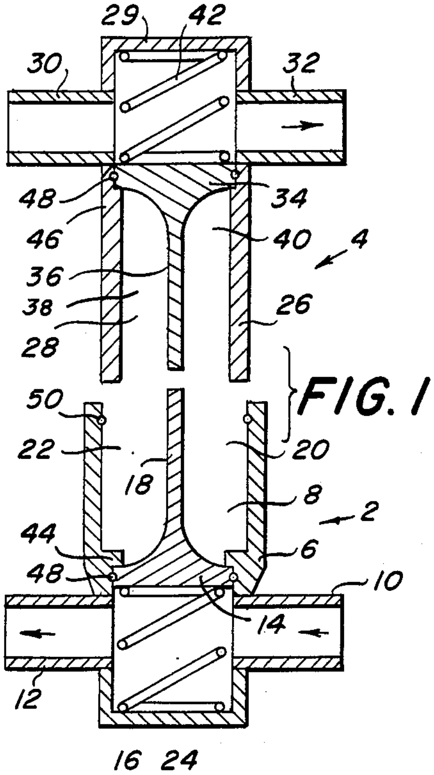
FIG. 1
FIG. 2
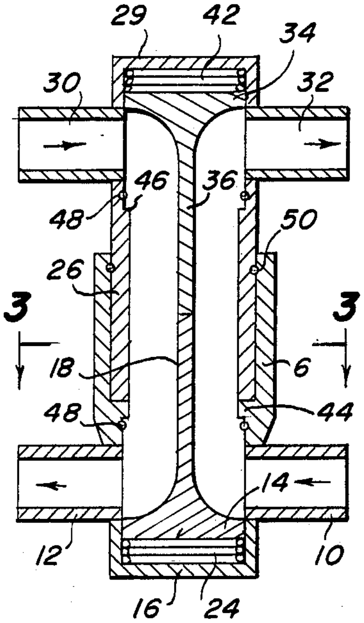
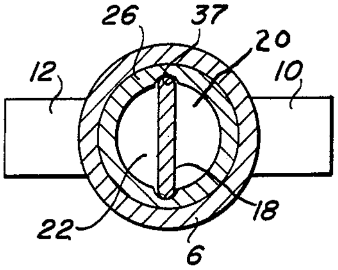
FIG. 3
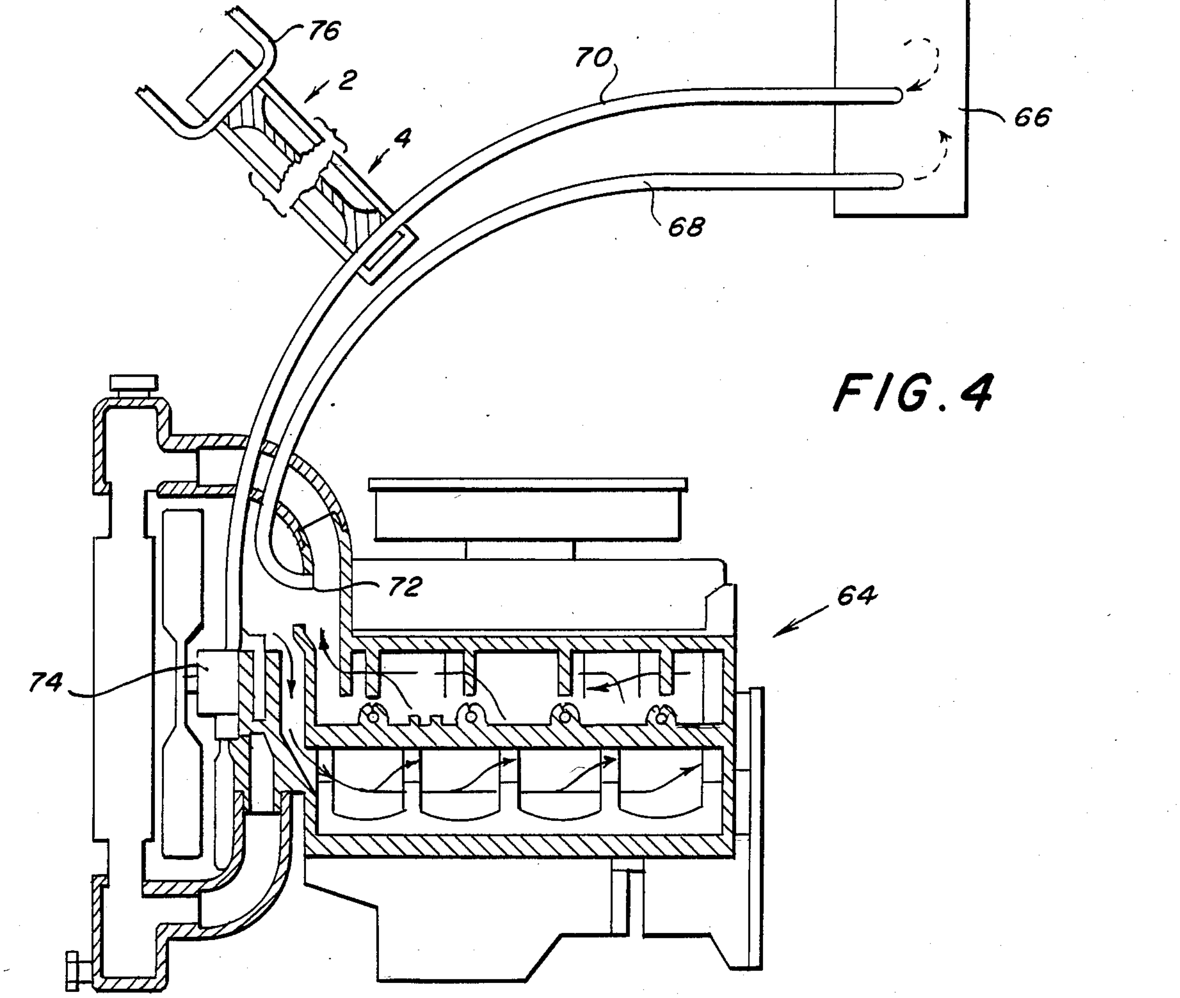
FIG. 4

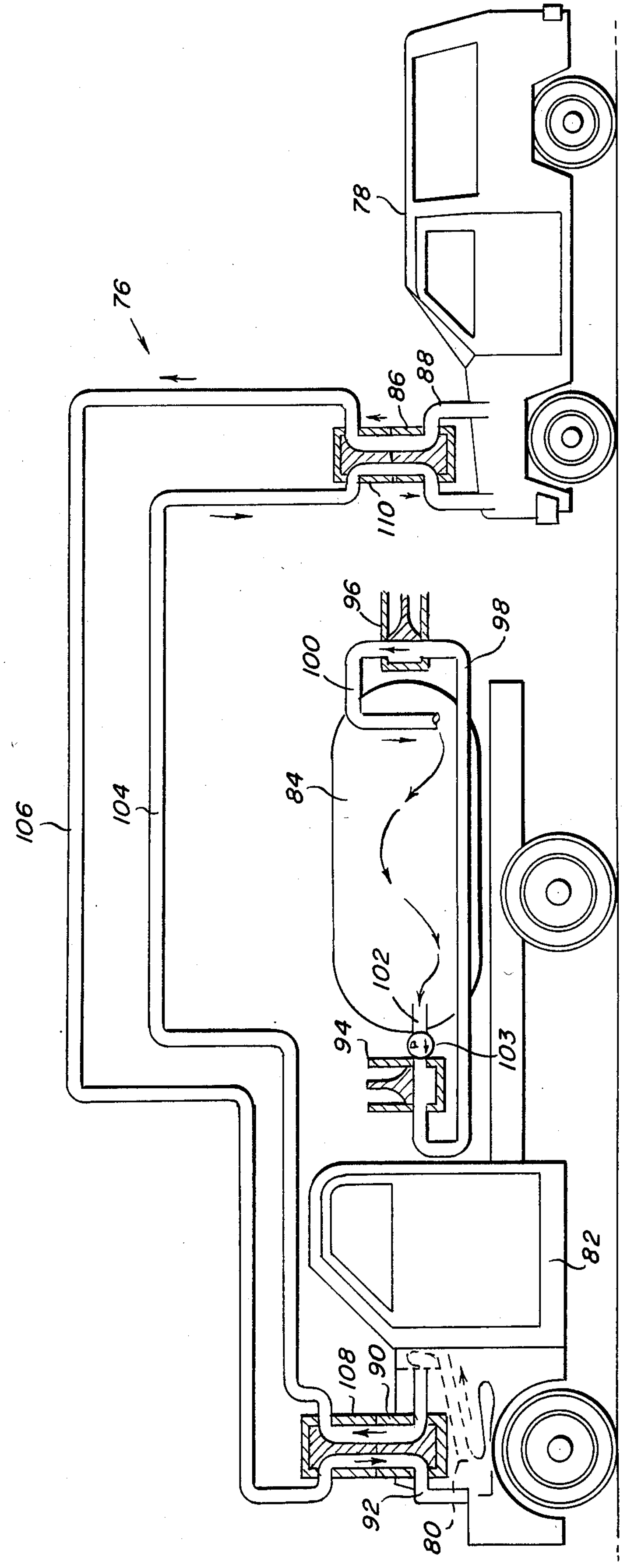
F/G. 7

APPARATUS FOR HEATING AN ENGINE USING A DUAL-POSITION CONTINUOUS FLOW VALVE ASSEMBLY

BACKGROUND OF THE INVENTION

In cold climates, it is often difficult to start the gasoline and diesel engines of cars and trucks. The present invention relates to a system easy to install in minutes on the spot to one of the heater hoses of a vehicle using a duel-position continuous flow valve assembly for connecting a hot fluid source with the cooling system of a cold engine to circulate the hot fluid through the engine, thereby heating the engine to facilitate starting.

BRIEF DESCRIPTION OF THE PRIOR ART

It is well-known in the patented prior art to heat an automobile or truck engine by coupling the fluid cooling system of a cold engine to a hot fluid source as evidenced by the U.S. patents to Smith U.S. Pat. No. 2,716,400, Collins U.S. Pat. No. 3,373,728, Elder U.S. Pat. No. 4,051,825 and Majkrzak U.S. Pat. No. 4,305,354. The Smith patent, for example, discloses a system for warming a plurality of internal combustion engines by circulating hot water from a large water heater through the cooling systems of the engines. The Collins, Elder, and Majkrzak patents disclose various systems for coupling the fluid cooling system of a cold engine to that of a hot service engine to circulate hot antifreeze through the engine block and heat the initially cold fluid therein. More particularly, the Collins system transfers heat from a heated engine to a cold engine using a heat exchanger which is a significant drawback. The Elder system eliminates the heat exchanger, but directly mixes the coolant of the heated and cooled engines using a plurality of special hoses which are cumbersome to connect and disconnect. Finally, the Majkrzak device requires three connectors to be installed in very hard to reach places, especially in V-6 and V-8 engines. Since two of the three nipples are used during the heating operation, the person using the system must understand the operation of the vehicle's cooling system in order to connect the nipples correctly. This limits its use to a very few people.

While the prior systems normally operate quite satisfactorily, they each possess certain inherent drawbacks which have hindered their use in practice. As set forth above, the prior systems are difficult to install, connect, and disconnect with a cold engine. More particularly, the prior devices require the removal and installation of certain plugs and connectors to the engine which are not easily accessible, specifically in V-6 and V-8 engines. Therefore, the prior devices must normally be installed by a skilled mechanic at great cost, using a variety of sizes of parts and conduits in accordance with the make and size of the engine to be heated. Furthermore, some prior systems do not lend themselves to mobility such as is necessary when a stalled vehicle is located in a remote area or parked on a city street. In such situations, it is difficult if not impossible to afford a quick installation of a system between the heated fluid source and a cold engine.

Various types of valve couplers are known in the art which provide at least two flow paths as evidenced by the patents to Jones U.S. Pat. No. 2,359,648 and La Belle U.S. Pat. No. 3,074,430. These prior coupling devices are rather complex and expensive, and are difficult to connect and disconnect as is necessary for temporarily coupling a heated fluid source with a cold engine. Moreover, the prior devices are not suitable for permanent mounting within a fluid conduit and operable to provide two separate flow passages in accordance with whether the valves are connected or disconnected.

The present invention was developed in order to overcome these and other drawbacks of the prior devices by providing an effective inexpensive system for connecting a cold engine with a hot fluid source using an improved dual-position continuous flow valve assembly which requires no alterations to the engine except for the cutting of one heater hose to install the dual position continuous flow valve.

SUMMARY OF THE INVENTION

Accordingly, it is a primary object of the present invention to provide a valve assembly including male and female valve members which can be installed on the spot in a few minutes by a skilled mechanic as well as an amateur and a quick connect/disconnect device therefor. The male and female valve members each include a generally cylindrical hollow housing defining a chamber closed at one end and open at the other end. The housings contain diametrically opposed inlet and outlet openings adjacent the closed ends thereof. A piston is slidably mounted within each housing for axial displacement between a first position wherein the piston is spaced from the housing closed end beyond the inlet and outlet openings and a second position wherein the piston is adjacent the housing closed end before the inlet and outlet openings. Each piston includes a generally planar stem portion which extends diametrically across the chamber and toward the open end of each housing to bisect the chambers into first and second flow passages, respectively. When a piston is in its first position, it affords fluid communication between the associated inlet and outlet openings and when in its second position, it affords fluid communication between the inlet opening and the first flow passage and between the second flow passage and the outlet opening. A spring is provided within the chamber of each valve housing biasing the piston therein toward the first position. A connecting device connects the male and female valves together in axial alignment with the male housing open end arranged within the female housing chamber and with the respective piston stem portion in aligned coplanar engagement. When the male and female valve members are connected together, the pistons are displaced to their second positions to define a first fluid flow path from the male valve inlet opening to the female valve outlet opening via the male valve first passage and the female valve second passage and a second fluid flow path from the female valve inlet opening to the male valve outlet opening via the female valve first passage and the male valve second passage.

According to a more specific object of the invention, the inlet and outlet openings of the male valve member are connected with a heater hose of an engine to be heated and the inlet and outlet openings of the female valve member are connected with a source of heated fluid, whereby the heated fluid is circulated through the engine.

According to another object of the invention, the male and female valve housings each include internal stops for arresting displacement of the pistons by the springs at the first positions.

It is a further object of the invention to provide seals adjacent the stops of each valve member to prevent fluid leakage.

According to another object of the invention, a quick-release spring biased locking ring assembly connects the male and female valves together.

BRIEF DESCRIPTION OF THE FIGURES

Other objects and advantage of the subject invention will become apparent from a study of the following specification when viewed in the light of the accompanying drawing, in which:

FIG. 1 is a sectional view of the male and female valve members of the dual-position continuous flow valve assembly;

FIG. 2 is a sectional view of the valve assembly of FIG. 1 in an assembled condition;

FIG. 3 is a sectional view of the valve assembly taken along line 3—3 of FIG. 2;

FIG. 4 is a partial sectional view illustrating the male valve member connected with a heater hose of an engine to be heated;

FIG. 7 is a schematic illustration of the apparatus for heating an engine using a dual-position continous flow valve assembly according to the invention;

DETAILED DESCRIPTION

Figure 10:
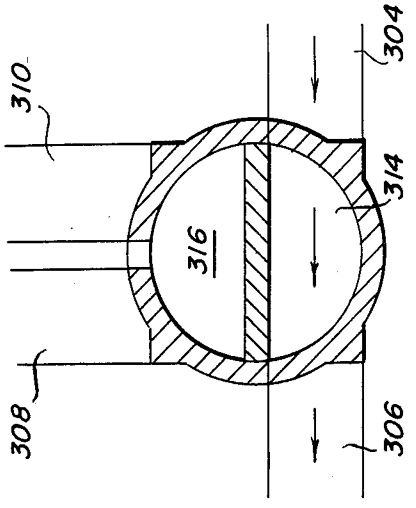
FIGS. 9 and 10 are top sectional views of the valve member of FIG. 8 in its first and second positions, respectively.

Referring first to FIGS. 1 and 2, the improved dual-position continuous flow valve assembly according to the present invention includes a first or female valve member 2 and a second or male valve member 4. The female valve member 2 includes a generally cylindrical housing 6 open at its upper end to define a chamber 8. Adjacent the closed end thereof, the housing contains a pair of opposed inlet 10 and outlet 12 openings which communicate with the chamber. A piston 14 is slidably mounted within the housing 6 for axial displacement between a first upper position as shown in FIG. 1 and a second lower position as shown in FIG. 2. In the first position the piston 14 is spaced from the closed end 16 of the housing and is arranged above the inlet and outlet openings. In its second position, the piston 14 is arranged adjacent the housing closed end 16 below the inlet and outlet openings as shown in FIG. 2. The piston includes a generally planar stem portion 18 which extends diametrically across the chamber and toward the housing open end to bisect the chamber into first 20 and second 22 flow passages, respectively, as shown in FIG. 3. A spring 24 is arranged within the chamber between the bottom of the piston and the housing closed end 16 and normally biases the piston toward its first position shown in FIG. 1. With the piston in its first position, fluid communication is afforded between the housing inlet opening 10 and the outlet opening 12, and when the piston is in its second position, a first flow path is defined between the housing inlet opening 10 and the first passage 20 and a second flow path is defined between the second pasage 22 and the housing outlet opening 12.

The male valve member 4 is of a similar configuration as the female valve member 2 and includes a cylindrical hollow housing 26 defining a chamber 28 and being open at one end. Adjacent the closed end 29 thereof, the housing 26 includes diametrically opposed inlet 30 and outlet 32 openings which communicate with the chamber 28. A piston 34 is slidably mounted within the housing 26 for axial displacement between a first position as shown in FIG. 1 wherein the piston is spaced from the housing closed end 29 beyond the inlet 30 and outlet 32 openings, and a second position as shown in FIG. 2, wherein the piston is adjacent the housing closed end 29 above the inlet and outlet openings. The piston 34 includes a generally planar stem portion 36 which extends diametrically across the chamber 28 and toward the open end of the housing 26 to bisect the chamber into first 38 and second 40 flow passages. As shown in FIG. 3, the male valve member housing 26 contains in its inner wall surface a pair of opposed grooves 37 adapted to receive the edges of the male and female piston stem portions for sliding movement therein. The female valve member housing may contain corresponding grooves to stabilize the piston stem. When the piston 34 is in its first position as shown in FIG. 1, fluid communication is afforded between the inlet 30 and outlet 32 openings of the housing through the portion of the chamber 28 adjacent the closed end 29 of the housing 26. When the piston is in its second position as shown in FIG. 2, the inlet opening 30 communicates with the first flow passage 38 and the outlet opening 32 communicates with the second flow passage 40 as shown in FIG. 2. A spring 42 is mounted within the chamber of the housing 26 to bias the piston 34 toward its first position.

The inner wall of the female valve housing 6 includes a pair of integral stop portions 44 which arrest movement of the piston 14 beyond its first position. Similarly, the male valve housing 26 includes a pair of integral stop portions 46 to arrest movement of the piston 34 beyond its first position.

The male valve housing 26 has an outer diameter corresponding with the inner diameter of the female valve housing 6 as shown in FIG. 1. The open end of the female valve housing is adapted to receive the open end of the male valve housing as shown in FIG. 2 with the stem portions of the respective valves being aligned to coplanar engagement, whereby as the male housing is inserted into the female housing the pistons 14, 34 are biased against the action of the springs 22, 42 toward their second positions, respectively. When the male housing is fully inserted within the female housing chamber, the edge of the male housing adjacent the open end thereof abuts the stops 44 of the female housing 6. With the male and female valves so assembled as shown in FIG. 2, a first fluid flow path is defined between the female valve inlet opening 10 and the male valve outlet opening 32 via the female valve first passage 8 and the male valve second passage 40. A second flow passage is defined between the male valve inlet opening 30 and the female valve outlet opening 12 via the male valve first passage 38 and the female valve second passage 22.

In order to prevent leakage of the valve assembly, suitable seals such as O-rings 48 are provided in annular recesses (not shown) contained in the inner wall surface of the male and female housings adjacent the stops 44 and 46, respectively, to prevent leakage beyond the pistons 14 and 34 when the pistons are in their first positions. A further O-ring 50 may be provided in a recess contained in the inner wall of the female valve housing 6 adjacent the open end thereof to prevent leakage between the housings of the male and female valves when they are in their assembled condition as shown in FIG. 2.

Figure 5:
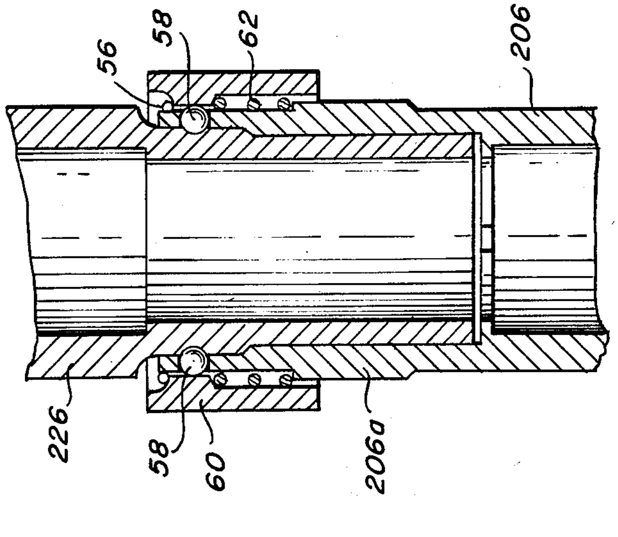
FIG. 5 is a partial sectional view of the assembled valve assembly with the pistons omitted for clarity illustrating a device for connecting the valve members together.
Figure 6:
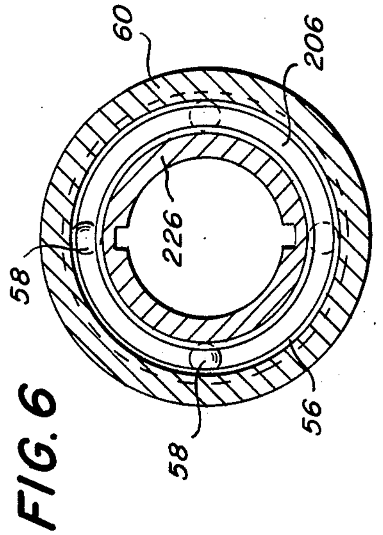
FIG. 6 is a top plan view of the connecting device of FIG. 5.

Referring to FIGS. 5 and 6, a locking ring mechanism is provided to connect the male and female valve members together. This assembly affords a quick release mechanism necessary to connect and disconnect the valve members in a quick and easy fashion. As shown in FIG. 5, a locking ring 56 is provided adjacent the upper open end of the female valve housing 206. A plurality of locking balls 58 are arranged circumferentially about the inner wall surface of the female valve housing 206 which contains an annular recess (not shown) for receiving a portion of the locking balls 58. Similarly, the outer circumferential surface of the male valve housing 226 contains a correponding annular recess (not shown) for receiving the locking balls 58. An outer collar 60 is provided adjacent and circumferentially about the locking ring 56, and a spring 60 is provided between the outer wall surface of the female valve housing 206 and the collar as shown in FIG. 5. The spring 62 is seated on an annular projection 206*a* integrally projecting from the female housing 206. When the male valve housing 226 is inserted into the chamber of the female valve housing 206, the spring-biased collar and locking ring assembly actuates the locking balls to engage the annular recesses of the male and female housings, thereby to securely connect the male and female valve members together.

When the male and female valve members are connected together, their housings are axially aligned and their piston stem portions are arranged in coplanar engagement, whereby the flow passages defined within the corresponding bisected chambers permit efficient fluid flow therein.

The improved valve assembly shown in FIGS. 1 and 2 is suitable for connecting a hot fluid source with the cooling system of an internal combustion gasoline or diesel engine as shown in FIGS. 4 and 7. Referring first to FIG. 4, the cooling system of an internal combustion engine 64 is connected with a vehicle heater 66 by two heater hoses 68, 70. The hose 68 is connected between the hot water outlet 72 of the engine and the automobile heater 66, and the hose 70 is connected between the automobile heater 66 and the water pump 74 of the engine. A male valve member 4 is connected with one of the heater hoses 68, 70.

For example, the heater hose 70 is cut and the male valve member is inserted in the heater hose. As shown in FIG. 1, the male valve housing 26 includes projection portions corresponding with the inlet and outlet openings thereof. The projection portion corresponding with the inlet opening 30 is inserted into the cut hose portion coming from the automobile heater 66 and the projection portion corresponding with the outlet opening 32 is inserted into the cut hose portion leading to the engine water pump 74. Suitable clamping devices (not shown) clamp the hose portions to the respective valve projection portions, whereby the male valve member is securely retained in the hose line. Accordingly, with the male valve member 4 in its disconnected state relative to the female valve member 2, the spring of the male valve member biases the piston toward its first position, whereby fluid passes from the inlet opening 30 to the outlet opening 32 of the male valve member. The female valve member 2 is connected in a similar fashion at its inlet and outlet openings with a sling 76 which will be discussed in greater detail below.

FIG. 7 is a schematic diagram of a system for heating the cold engine of a vehicle 78 from a hot fluid source, such as the cooling system of a hot running engine 80 of a mobile vehicle 82 or a hot fluid tank 84—which may have its own heating source—mounted on the vehicle. A male valve member 86 of the type illustrated in FIG. 1 is connected in the heater hose line 88 of the vehicle 78 in the manner shown in FIG. 4. Similarly, a male valve member 90 is connected in the heater hose line 92 of the mobile vehicle. Finally, male valve members 94 and 96 are connected in a fluid line 98 coupled with the inlet 100 and outlet 102 openings of the tank. Any number of male valves may be connected in a tank fluid line 98 in order to service a number of cold engines simultaneously. A pump 103 in the line 98 assists fluid flow into and through the tank 84.

The fluid coupling sling 76 comprises a pair of flexible hoses 104, 106, one hose 104 for fluid delivery and the other hose 106 for fluid return. One end of the delivery hose 104 is connected with the outlet opening of a female valve 108 and the other end of the delivery hose is connected with the inlet opening of a female valve 110. Similarly, one end of the return hose 106 is connected with the outlet opening of the female valve 110 and the other end of the return hose is connected with the inlet opening of the female valve 108. The female valve 108 is connected with the male valve 90 and the female valve 110 is connected with the male valve 86 by a quick connect/disconnect device (not shown in FIG. 7) such as the locking ring assembly of FIGS. 5 and 6.

With the valves connected as shown, the pistons of all of the valves are displaced to their second positions allowing heated fluid such as a mixture of water and antifreeze to flow from the engine 80 of the mobile vehicle to the cold engine of the vehicle 78 via the valve assemblies and the delivery hose 106, and cold fluid from the engine of the vehicle 78 is delivered to the engine 80 of the mobile vehicle 82 via the valve assemblies and the return hose 106 for heating. After a few minutes of such a fluid circulation, the engine block of the vehicle 78 is heated sufficiently to enable the engine to start.

The female valve 110 may be quickly disconnected from the male valve 86 of the vehicle 78 and connected with one of the male valves 94, 96 of the tank 84 to deliver heated fluid to the tank as a reserve for the next service call. As soon as the female valve 110 is disconnected, its piston and the piston of the male valve 86 shift back to their normal first positions owing to the biasing forces of the respective springs. This prevents leakage from the sling 76 and from the heater hose 88 since the female valve 110, when disconnected, affords fluid communication from the delivery hose 106 via the inlet and outlet openings thereof when the piston is in its first position, as shown in FIG. 1. Similarly, the male valve, when disconnected, provides a flow path between its inlet and outlet openings with the piston thereof in its first position to provide fluid flow from the vehicle heater through the heater hose 88 to the engine of the vehicle 78.

Alternatively, the female valve 108 may be quickly disconnected from the male valve 90 and connected with the one of the male valves 94, 96 of the tank 84 to deliver heated fluid from the tank to the vehicle 78 whose engine is to be heated. Once the vehicle 78 is started and warms up, it becomes a hot service vehicle for warming other vehicles.

It will be appreciated to those skilled in the art that the sling may comprise male valves and the vehicles may have female valves connected in the heater hoses thereof, so long as where a valve coupling is desired, mating valves are provided.

It will also be appreciated by those skilled in the art that the valve and sling assembly may be used to connect a hot water source with any device whose fluid is to be heated such as a water bottle, water bed, or heated fluid blanket. For example, the invention can be used to supply hot fluid to an auxiliary heater similar to those used on recreational vehicles to provide emergency heat in a given situation, the auxiliary heater having an electric blower connected with the cigarette lighter of the vehicle. The invention can also be used to provide hot fluid to a hot water blanket or pad to be used in case of accidents where the victims lie out in the cold waiting for an ambulance or used by farmers and ranchers to save the life of animals stranded in remote areas which would otherwise die if no other heat were available.

Figure 9:
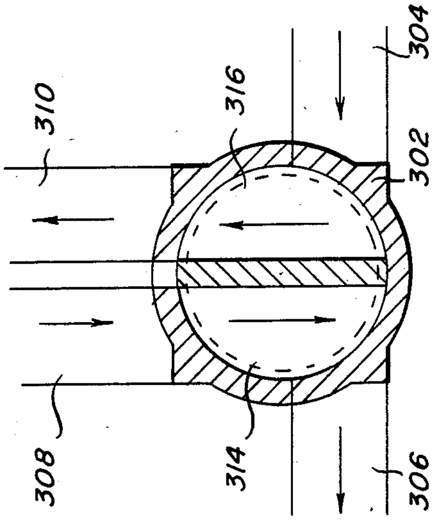
Figure 8:
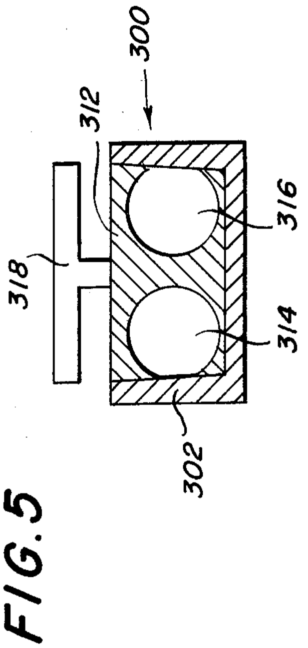
FIG. 8 is a sectional view of a manually operable dual-position continuous flow valve member according to an alternate embodiment of the invention.

An alternate embodiment of the valve assembly is shown in FIGS. 8-10. As shown therein, the assembly 300 includes a housing 302 having a first inlet opening 304 and a first outlet opening 306 adapted for connection with a vehicle heater hose. The housing also includes a second inlet opening 308 and a second outlet opening 310 adapted for connection with a sling or the like. Rotatably mounted within the housing 302 is a valve member 312 containing a pair of conduits 314, 316. A handle 318 extends from the housing and provides means for manually rotating the valve member between first and second continuous flow positions. In the first position shown in FIG. 9, fluid communication is afforded between the first inlet opening 304 and the second outlet opening 310 via the conduit 316 and between the second inlet opening 308 and the first outlet opening 306 via the conduit 314. In the second position shown in FIG. 10, fluid communication is afforded between the first inlet opening 304 and the first outlet opening 306 via the conduit 314, and the second inlet and outlet openings are blocked.

The valve assembly according to the subject invention is formed of any suitable durable material such as metal or synthetic plastic. For heavy duty use, such as for a fleet of diesel powered trucks, a strong metal such as steel is preferred, whereby the valve assembly could easily withstand daily connection and disconnection.

In its preferred form, the diameters of the male and female housing are of a standard dimension to afford universal coupling therebetween. The projection portions adjacent the inlet and outlet openings of the valves could be manufactured with different diameters to fit the various heater hose dimensions in use today.

While in accordance with the provisions of the Patent Statute, the preferred forms and embodiments of the invention have been illustrated and described, it will be apparent to those skilled in the art that various changes and modifications may be made without deviating from the inventive concepts set forth above.

What is claimed is:

1. A dual-position continuous flow valve assembly, comprising (a) a first valve member, including (1) a first generally cylindrical hollow housing defining a chamber, said first housing being open at one end and including diametrically opposed inlet and outlet openings adjacent the closed end thereof;

(2) first piston means slidably mounted within said first housing for axial displacement between a first position wherein said first piston means is spaced from said first housing closed end beyond said inlet and outlet openings and a second position wherein said first piston means is adjacent said first housing closed end before said inlet and outlet openings, said first piston means including a generally planar stem portion extending diametrically across said chamber and toward said first housing open end to bisect said chamber into first and second flow passages, said first piston means when in said first position affording fluid communication between said inlet and outlet openings and when in said second position affording fluid communication between said inlet opening and said first flow passage and between said second flow passage and said outlet opening; and (3) first spring means arranged within said chamber for biasing said first piston means toward said first position.

2. Apparatus as defined in claim 1, and further comprising (b) a second valve member, including (1) a second generally cylindrical hollow housing defining a chamber, said second housing having an outer diameter corresponding with the inner diameter of said first housing, said second housing being open at one end and including diametrically opposed inlet and outlet openings adjacent the closed end thereof;

(2) second piston means slidably mounted within said second housing for axial displacement between a first position wherein said second piston means is spaced from said second housing closed end beyond said inlet and outlet openings and a second position wherein said second piston is adjacent said second housing closed end before said inlet and outlet openings, said second piston means including a generally planar stem portion extending diametrically across said chamber and toward said second housing open end to bisect said chamber into first and second flow passages, said second piston means when in said first position affording fluid communication between said inlet and outlet openings and when in said second position affording fluid communication between said inlet opening and said first flow passage and between said second flow passage and said outlet opening; and (3) second spring means arranged with said chamber for biasing said second piston means toward said first position; and (c) means connecting said first and second valve members together in axial alignment with said second housing open end arranged within said first housing chamber and with said first and second piston stem portions in aligned coplanar engagement, said first and second piston means being displaced to their second positions, respectively, when said first and second valve members are connected together, whereby the connected valve assembly defines a first fluid flow path from said first housing inlet opening to said second housing outlet opening via said first chamber first passage and said second chamber second passage and a second fluid flow path from said second housing inlet opening to said first housing outlet opening via said second chamber first passage and said first chamber second passage.

3. Apparatus as defined in claim 2, wherein said first and second housings each include stop means for arresting displacement of said corresponding piston means by said corresponding spring means at said first position.

4. Apparatus as defined in claim 3, wherein said first and second housing each include seal means arranged adjacent said stop means.

5. Apparatus as defined in claim 4, wherein said connecting means includes a spring-biased locking ring assembly.

6. Apparatus as defined in claim 2, wherein said first and second housings each contain a pair of opposed grooves parallel to the axes thereof for receiving the edges of said first and second piston stem portions, respectively.

7. A system for heating the cooling fluid of an internal combustion engine, comprising (a) a source of heated fluid having inlet and outlet openings;

(b) first valve means connected with said source and including (1) a first generally cylindrical hollow housing defining a chamber, said first housing being open at one end and including diametrically opposed inlet and outlet openings adjacent the closed end thereof and connected with said source outlet and inlet openings, respectively;

(2) first piston means slidably mounted within said first housing for axial displacement between a first position wherein said first piston means is spaced from said first housing closed end beyond said first valve inlet and outlet openings and a second position wherein said first piston means is adjacent said first housing closed end before said first valve inlet and outlet openings, said first piston means including a generally planar stem portion extending diametrically across said chamber and toward said first housing open end to bisect said chamber into first and second flow passages, said first piston means when in said first position affording fluid communication between said first valve inlet and outlet openings and when in said second position affording fluid communication between said first valve inlet opening and said first flow passage and between said second flow passage and said first valve outlet opening; and (3) first spring means arranged within said chamber for biasing said first piston means toward said first position;

(c) second valve means connected with the internal combustion engine having fluid inlet and outlet openings, said second valve means including (1) a second generally cylindrical hollow housing defining a chamber, said second housing having an outer diameter corresponding with the inner diameter of said first housing, said second housing being open at one end and including diametrically opposed inlet and outlet openings adjacent the closed end thereof and connected with the outlet and inlet openings, respectively of the internal combustion engine;

(2) second piston means slidably mounted within said second housing for axial displacement between a first position wherein said second piston means is spaced from said second housing closed end beyond said second valve inlet and outlet openings and a second position wherein said second piston is adjacent said second housing closed end before said second valve inlet and outlet openings, said second piston means including a generally planar stem portion extending diametrically across said chamber and toward said second housing open end to bisect said chamber into first and second flow passages, said second piston means when in said first position affording fluid communication between said second valve inlet and outlet openings and when in said second position affording fluid communication between said second valve inlet opening and said first flow passage and between said second flow passage and said second valve outlet opening; and (3) second spring means arranged within said chamber for biasing said second piston means toward said first position; and (d) means connecting said first and second valve members together in axial alignment with said second housing open end arranged within said first housing chamber and with said first and second piston stem portions in aligned coplanar engagement, said first and second piston means being displaced to their second positions, respectively, when said first and second valve members are connected together, whereby heated fluid from said source flows to the internal combustion engine via said source outlet opening, said first chamber first passage, said second chamber second passage, said second valve housing outlet opening and the inlet opening to the engine, and further whereby fluid from the engine returns to said source for heating via the engine outlet opening, said second valve housing inlet opening, said second chamber first passage, said first chamber second passage, said first valve housing outlet opening and said source inlet opening.

8. Apparatus as defined in claim 7, wherein said first and second housings each include stop means for arresting displacement of said corresponding piston means by said corresponding spring means at said first position.

9. Apparatus as defined in claim 8, wherein said first and second housings each include seal means arranged adjacent said stop means.

10. Apparatus as defined in claim 9, wherein said connecting means includes a spring biased locking ring assembly.

11. Apparatus as defined in claim 7, and further comprising sling means connecting said first valve means with said source, said sling means including a pair of flexible tubes, one of said tubes connected at its opposite ends with said source outlet opening and said first valve housing inlet opening, respectively, and the other of said tubes connected at its oposite end with said source inlet opening and said first valve housing outlet opening.

* * * * *